Patented Dec. 22, 1931

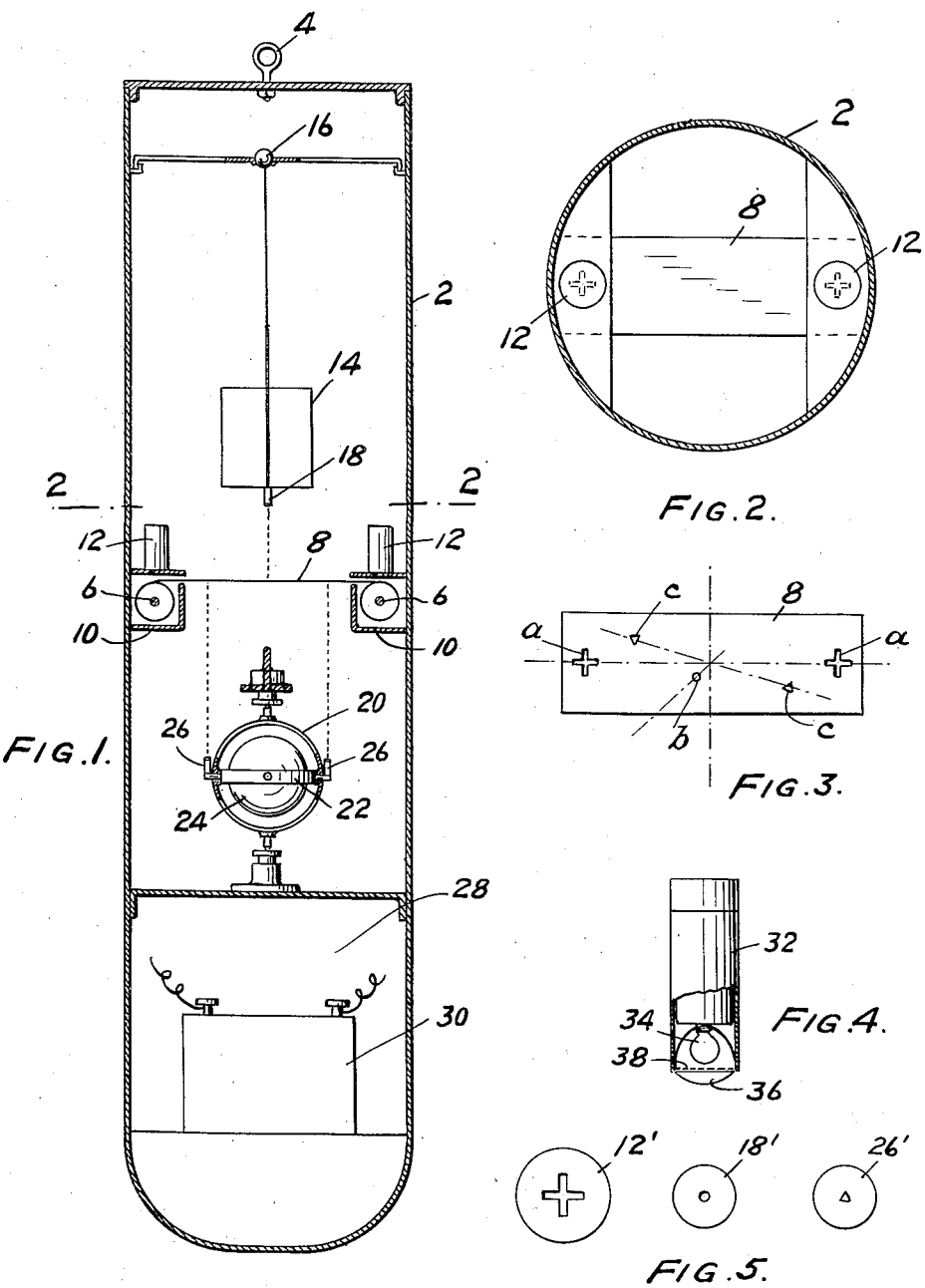

1,837,479

UNITED STATES PATENT OFFICE

JOSEPH N. PEW, JR., OF ARDMORE, AND CHARLES B. BAZZONI, OF SWARTHMORE, PENNSYLVANIA, ASSIGNORS, BY MESNE ASSIGNMENTS, TO SPERRY-SUN WELL SURVEYING COMPANY, OF PHILADELPHIA, PENNSYLVANIA, A CORPORATION OF DELAWARE

WELL SURVEY RECORDER

Application filed November 22, 1928. Serial No. 321,069.

This invention relates to a device for measuring the inclination of bore holes and their deviation in azimuth from a selected reference direction.

In drilling wells it is frequently found that, owing to non-uniformity of the strata through which the drill is passing, or other causes, the bore deviates very greatly from the vertical. In order to determine the direction which a well is taking during boring, it is customary to employ various devices for recording the deviations from the true vertical, so that these deviations may be corrected.

It is an object of the present invention to provide a well surveying device which may be lowered into the bore and which will make a graphical record of the deviations at the depth to which it is lowered. Further objects relate to improvements in the arrangements of parts of a well surveying device of this character and these objects and the modes of their accomplishment will be clear from the following description read in conjunction with the accompanying drawings, in which:

Fig. 1 is a longitudinal section through the center of the improved well surveying device.

Fig. 2 is a section on line 2—2 of Fig. 1.

Fig. 3 shows the record produced by the device.

Fig. 4 is a view partly in section showing a lamp which may be used in the device.

Fig. 5 illustrates three different masks for the light whereby it may be made to form different marks on a sensitized film.

The device comprises a cylindrical casing 2 which has suitable openings formed therein which may be closed to maintain the casing water-tight to protect the instruments therein. The casing is provided at its top with a suitable eye, or the like, 4 by which it may be suspended and lowered into a bore hole. It will be understood that the cable by which the device is lowered into the bore hole may be provided with suitable electric wires by means of which the operation of the device may be controlled from the surface.

Suitably mounted on spindles 6 is a strip of sensitized film 8 which, as shown in Fig. 1, extends across a space between two housings 10 enclosing the reels and which are provided with narrow slits through which the film may be moved. Located above housings 10 are suitable lamps 12 which are arranged to throw beams through apertures in the tops of the housings upon the ends of the exposed portion of the film. These lamps are of a character which will be later referred to and impart characteristic marks so as to indicate, at the time an exposure is made, the exact position of the film within the device.

A pendulum 14 is supported for universal movement, as indicated at 16, in a suitable bracket in the frame. At its lower end this pendulum carries a suitable lamp 18 which is arranged to project a beam of light of desired character upon film 8.

Mounted in suitable brackets in the casing so as to rotate about a longitudinal axis is a gimbal ring 20, while pivotally mounted therein for rotation about an axis perpendicular to the said longitudinal axis is a second gimbal ringle 22. Rotatably mounted in the second gimbal ring 22 to rotate about an axis perpendicular to previously mentioned axes is a gyroscope 24. Carried by gimbal ring 20 at the ends of the pivotal axis of gimbal ring 22 are suitable lamps 26 which are arranged to throw beams constantly parallel to the axis of rotation of gimbal ring 20 upon film 8. Gyroscope 24 is preferably provided with an internal three-phase induction motor driven by means of a motor generator set or a dynamotor located in a chamber 28, the motor of which is driven by means of a storage battery 30 located in the same chamber or from a source of supply on the surface, connection being had through the supporting cable. Since the specific driving means may be of any ordinary type, it is not described in detail.

Connected to one or both of spindles 6 is any suitable mechanism (not shown) which may be driven by clock-work or mechanism controlled from the surface by an operator. This mechanism will serve to rotate the reel of film to expose new portions thereof to obtain a series of records.

Lamps 12, 18 and 26 may be similar in construction and this construction is shown in Fig. 4. Each lamp consists of a casing 32 in which is mounted a small lamp 34 arranged to project a beam through a lens 36 which renders the rays parallel to form a pencil of light. Disposed between the lamp and lens 36 is a diaphragm 38 provided with any desired aperture. Examples of these diaphragms are shown in Fig. 5, 12' being used in lamps 12, 18' in lamp 18 and 26' in lamps 26. As shown, these diaphragms are provided respectively with apertures in the form of a cross, a circle, and a triangle. By this means the spots formed by the various lamps may be readily determined upon development of the film.

In operation, the gyroscope of the well surveying device is started at the surface and set so that the gyroscope takes a definitely located position, for example, with its axis pointing north and south. The casing is then closed and the device lowered into the bore. Upon reaching the proper depth, a suitable control means is set into operation to light lamps 12, 18 and 26 to produce suitable exposure. The lamps may then be extinguished and the device withdrawn from the bore. If a series of exposures are desired, the clockwork or other mechanism in the casing may be set into operation to bring new portions of film 8 into exposed positions, the casing being raised or lowered to the desired depths for these subsequent exposures.

Upon withdrawal of the device from the bore, the film may be removed and developed. A section of the developed film will appear as in Fig. 3, in which the orientation marks of lamps 12, 18 and 26 are respectively designated as $a$, $b$ and $c$. Measurement of this record or placement of the same in a suitable jig will indicate the deviations of the bore hole from the vertical. A line drawn between $a$—$a$ and $c$—$c$ will show the center of the film at which mark $b$ should appear if the hole were vertical. The deviation of mark $b$ from this center will indicate the deviation from the vertical, while the angle between line $c$—$c$ and the center line through $b$ will indicate the direction of such deviation.

What we claim and desire to protect by Letters Patent is:

1. A well surveying device comprising a casing, a sensitized member mounted in the casing, means for recording orientation marks on said sensitized member indicating its position relative to the casing, means for recording orientation marks on said sensitized member indicating its position relative to the earth, a pendulum, and means carried by the pendulum for recording the position thereof on the sensitized surface.

2. A well surveying device comprising a casing, a sensitized member mounted in the casing, a pendulum supported above the sensitized member, means carried by the pendulum for recording the position thereof on the sensitized member, a gyroscope mounted in the casing below the sensitized member and arranged to maintain an axis in fixed relation to the earth, and means for recording on the sensitized member the position thereof relative to the axis.

In testimony of which invention, we have hereunto set our hands, at Philadelphia, Pennsylvania, on this nineteenth day of November, 1928.

JOSEPH N. PEW, Jr.
CHARLES B. BAZZONI.